(12) United States Patent
Yarman et al.

(10) Patent No.: US 9,091,784 B2
(45) Date of Patent: Jul. 28, 2015

(54) DETERMINING AN OUTPUT REPRESENTING A TARGET STRUCTURE BASED ON ENCODED SOURCE AND RECEIVER DATA

(75) Inventors: Can Evren Yarman, Houston, TX (US); Paul N. Childs, Cambridge (GB); Eugene William Starr, Willis, TX (US)

(73) Assignee: WesternGeco L.L.C., Houston, TX (US)

( * ) Notice: Subject to any disclaimer, the term of this patent is extended or adjusted under 35 U.S.C. 154(b) by 464 days.

(21) Appl. No.: 13/524,419

(22) Filed: Jun. 15, 2012

(65) Prior Publication Data
US 2013/0338922 A1    Dec. 19, 2013

(51) Int. Cl.
| G01V 1/34 | (2006.01) |
|---|---|
| G01V 3/38 | (2006.01) |
| G01V 1/30 | (2006.01) |
| G01V 1/28 | (2006.01) |

(52) U.S. Cl.
CPC ...... *G01V 1/30* (2013.01); *G01V 1/282* (2013.01); *G01V 2210/614* (2013.01)

(58) Field of Classification Search
CPC ............ G01V 1/282; G01V 1/30; G01V 1/306–1/307; G01V 1/32; G01V 1/325; G01V 1/34; G01V 1/345; G01V 1/36; G01V 1/364; G01V 1/366; G01V 1/368; G01V 1/375; G01V 2210/614; G01V 3/38
USPC ............ 702/6, 1–2, 11–13, 16, 33, 56, 127, 702/179, 189; 703/1–2, 5, 10; 367/37–38, 367/40, 47–48, 53, 56, 58, 73
See application file for complete search history.

(56) References Cited

U.S. PATENT DOCUMENTS

| 4,168,485 A | 9/1979 | Payton et al. |
|---|---|---|
| 4,601,022 A | 7/1986 | Muir |
| 6,021,094 A | 2/2000 | Ober et al. |
| 8,121,823 B2 | 2/2012 | Krebs et al. |
| 2003/0078734 A1 | 4/2003 | Ozbek |
| 2007/0030760 A1 | 2/2007 | Laake |
| 2009/0135670 A1 | 5/2009 | Deffenbaugh et al. |
| 2010/0018718 A1* | 1/2010 | Krebs et al. ............ 166/369 |
| 2010/0265794 A1 | 10/2010 | Johnson et al. |
| 2012/0026833 A1 | 2/2012 | Soubaras et al. |

OTHER PUBLICATIONS

International Search Report and Written Opinion of PCT Application No. PCT/US2013/045534 dated Nov. 1, 2013: pp. 1-12.
Capdeville, et al., "Towards global earth tomography using the spectral element method: a technique based on source stacking", Geophysical Journal International, vol. 162 (2), 2005, pp. 541-554.
Godwin, et al., "Blended Source Imaging by Amplitude Encoding", SEG Annual Meeting, Denver, Colorado, 2010, 5 pages.

(Continued)

*Primary Examiner* — Toan Le
(74) *Attorney, Agent, or Firm* — Abimbola Bukoye; Gary Gex

(57) ABSTRACT

A source wavefield is computed from encoded source data calculated by performing encoding of source wavelets with noise. A receiver wavefield is computed from encoded receiver data calculated by encoding of measured receiver data with the noise. An output representing a target structure is determined based on the source wavefield and the receiver wavefield.

21 Claims, 5 Drawing Sheets

(56) References Cited

OTHER PUBLICATIONS

Krebs, et al., "Fast full-wavefield seismic inversion using encoded sources", Geophysics, vol. 74 (6), 2009, pp. WCC177-WCC188.

Liu, et al., "Toward a unified analysis for source plane-wave migration", Geophysics, vol. 71 (4), 2006, pp. S129-S139.

Neelamani, et al., "Efficient Seismic Forward Modeling Using Simultaneous Random Sources and Sparsity", SEG Annual Meeting, Las Vegas, Nevada, 2008, 5 pages.

Neelamani, et al., "Efficient Seismic Forward Modeling Using Simultaneous Random Sources and Sparsity", Geophysics, vol. 75 (6), 2010, pp. WB15-WB27.

Romberg, Justin , "Compressive sensing by random convolution", SIAM J. Imaging Sciences, vol. 2 (4), 2009, pp. 1098-1128.

Romero, et al., "Phase encoding of shot records in prestack migration", Geophysics, vol. 65 (2), 2000, pp. 426-436.

Stoffa, et al., "Plane-wave depth migration", Geophysics, vol. 71 (6), 2006, pp. S261-S272.

Tang, Y., "Target-oriented wave-equation least-squares migration/inversion with phase-encoded Hessian", Geophysics, vol. 74 (6), 2009, pp. WCA95-WCA107.

Vigh, et al., "3D prestack plane-wave, full-waveform inversion", Geophysics, vol. 73 (5), 2008, pp. VE135-VE144.

Zhang, et al., "Reverse-time Migration: Amplitude and Implementation Issues", SEG Annual Meeting, San Antonio, Texas, 2007, 5 pages.

\* cited by examiner

DETERMINING AN OUTPUT REPRESENTING A TARGET STRUCTURE BASED ON ENCODED SOURCE AND RECEIVER DATA

BACKGROUND

A survey operation can be used for acquiring data to identify subterranean elements of interest, such as hydrocarbon reservoirs, freshwater aquifers, gas injection zones, and so forth. In seismic surveying, seismic sources (such as seismic vibrators, air guns, or other types of sources) are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for measurement by seismic receivers (e.g., geophones, accelerometers, etc.). These seismic receivers can produce signals that represent detected seismic waves.

In other examples, electromagnetic (EM) surveying can also be used. In EM surveying, EM sources are used to generate EM waves that are directed into a subterranean structure. EM waves affected by the subterranean structure are detected by EM receivers, which can produce signals that represent the detected EM waves.

Signals from survey receivers (seismic receivers or EM receivers) can be processed to yield information about the content and characteristic of the subterranean structure.

SUMMARY

In general, according to some implementations, a method includes computing a source wavefield from encoded source data calculated by performing phase and amplitude encoding of source wavelets with noise, and computing a receiver wavefield from encoded receiver data calculated by encoding of measured receiver data with the noise. An output representing a target structure is determined based on the source wavefield and the receiver wavefield.

In general, according to some implementations, a computing system includes at least one processor to encode source wavelets with noise to produce noisy source wavelets, where the encoding applies phase and amplitude encoding to the source wavelets, and encode receiver data acquired by at least one survey receiver with noise to produce noisy receiver data. An output representing target structures is computed using the noisy source wavelets and the noisy receiver data.

In general, according to some implementations, an article comprising at least one machine-readable storage medium stores instructions that upon execution cause a system to compute a source wavefield from encoded source data calculated by performing encoding of source wavelets with white noise, and compute a receiver wavefield from encoded receiver data calculated by encoding of measured receiver data with the white noise. An output representing a target structure is determined based on the source wavefield and the receiver wavefield.

In further or other implementations, encoding the source wavelets with the noise includes encoding the source wavelets with random noise.

In further or other implementations, encoding the source wavelets with the noise comprises encoding the source wavelets with white noise.

In further or other implementations, encoding the source wavelets with the noise includes encoding a first group of source wavelets with first noise, and a second group of source wavelets is encoded with second, different noise.

In further or other implementations, determining the output is further based on the encoded second group of source wavelets.

In further or other implementations, source wavefields derived from the corresponding encoded groups of source wavelets are convolved with corresponding receiver wavefields, and partial outputs based on respective convolutions are produced.

In further or other implementations, the partial outputs are stacked to produce the output representing the target structure.

In further or other implementations, the source wavelets of the first and second groups correspond to respective survey sources.

In further or other implementations, the determining includes cross-correlating the source wavefield and the receiver wavefield.

In further or other implementations, the output is at least one selected from the group consisting of an image of the target structure and a model of the target structure.

In further or other implementations, the output is a model of the target structure, and encoding the source wavelets, encoding the receiver data, and computing the output is part of an iterative inversion process that incrementally updates the model over a plurality of iterations.

In further or other implementations, the source wavelets and receiver data are encoded with different noise in different ones of the iterations.

In further or other implementations, a source wavefield is computed based on the encoded source wavelets, and a receiver wavefield is computed based on the encoded receiver data. The output is based on the source wavefield and the receiver wavefield.

In further or other implementations, the source wavefield and the receiver wavefield are cross-correlated, and the output is based on the cross correlation.

In further or other implementations, a second group of source wavelets is encoded with second noise to produce a second group of noisy source wavelets, and second receiver data is encoded responsive to the second group of source wavelets, to produce second noisy receiver data. The output is further computed based on the second group of noisy source wavelets and second noisy receiver data.

Other or additional features will be apparent from the following description, from the drawings, and from the claims. The summary is provided to introduce a selection of concepts that are further described below in the detailed description. The summary is not to be intended to be used as an aid in limiting the scope of the claimed subject matter.

BRIEF DESCRIPTION OF THE DRAWINGS

Some embodiments are described with respect to the following figures.

DETAILED DESCRIPTION

Figure 1:
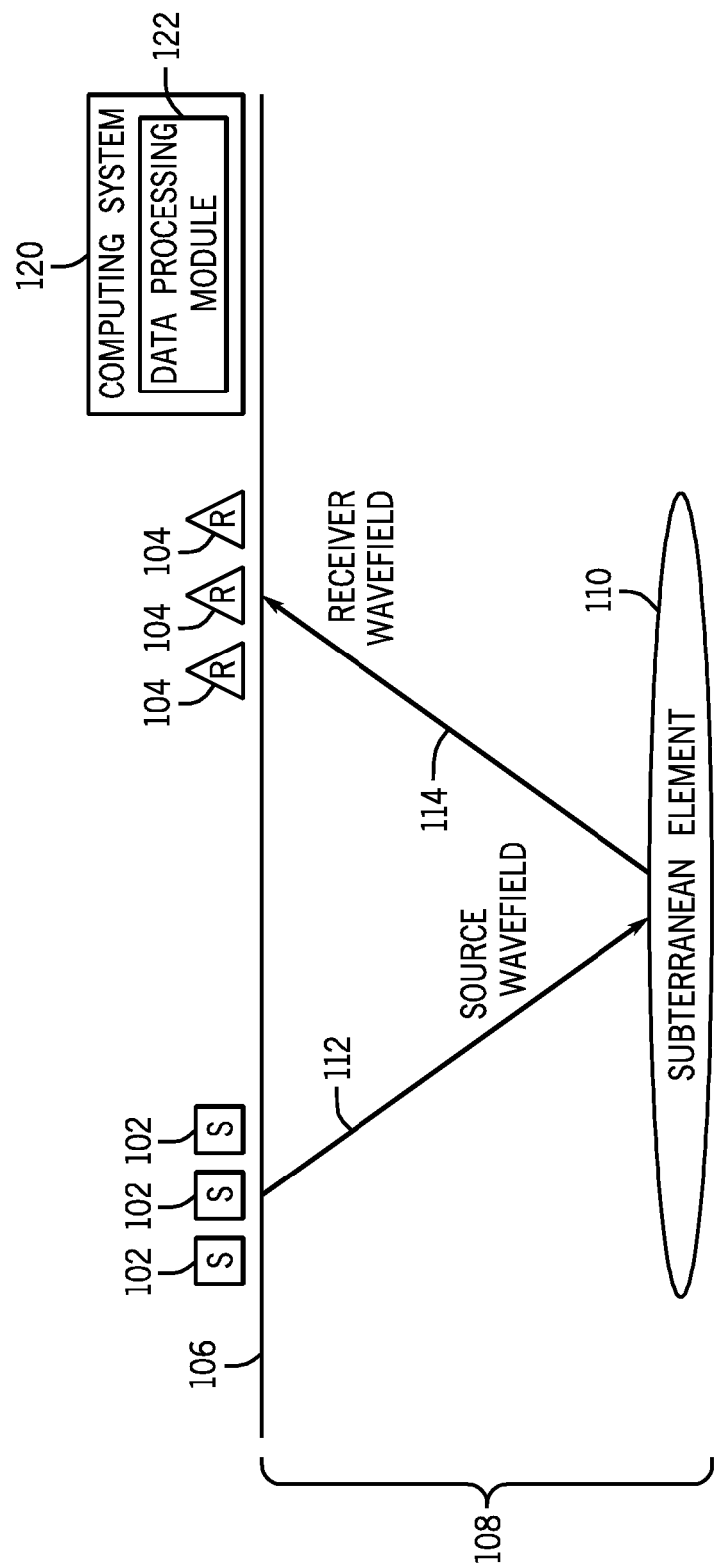
FIG. 1 is a schematic diagram of an example arrangement that includes survey sources and survey receivers to perform a survey operation, and a computing system that includes a data processing module according to some implementations.

In the ensuing discussion, reference is made to techniques or mechanisms applied with respect to subterranean structures. However, techniques or mechanisms according to some implementations can also be applied with respect to other target structures that are the subject of a survey, such as human tissue, mechanical structures, and so forth.

Survey data acquired by survey receivers in a survey operation of a subterranean structure can be processed to produce an image of the subterranean structure, to produce a model of the subterranean structure, or to produce some other output that represents the subterranean structure. The survey data can include any one or some combination of the following: seismic data acquired by seismic receivers, electromagnetic (EM) data acquired by EM receivers, or another type of survey data.

As examples, a migration process can be used to process survey data to produce an image of a subterranean structure. Generally, a migration process geometrically re-locates events (e.g., seismic events or events represented by EM signals) in either space or time to the location the event occurred in the subterranean structure, rather than the location that the event was recorded at the surface, to create the image of the subterranean structure. One example type of a migration process is a shot-profile migration process. Other types of migration processes can be used in other examples.

In other examples, survey data processing can include performing inversion to produce a model of the subterranean structure. An inversion process, such as a full-wave inversion (FWI) process, builds the model in a number of iterations by minimizing (or reducing) a misfit (or mismatch) between observed survey data and synthetic survey data. Synthetic data refers to data produced by simulation based on a current model of the subterranean structure. The iterations of the inversion process incrementally update the model until a stopping criterion is satisfied (e.g., the observed survey data differs from the synthetic survey data by less than a pre-defined threshold). The model that is produced by the inversion process can model at least one parameter (e.g., velocity, density, etc.) of the subterranean structure.

A survey operation can acquire a relatively large volume of survey data with respect to a subterranean structure. As a result, survey data processing can be computationally intensive. To reduce computational load while improving survey data processing results, techniques or mechanisms according to some embodiments can employ a processing framework in which blended or simultaneous sources are considered. In such implementations, survey data responsive to multiple survey sources is processed together to produce an output (e.g., image, model, etc.) that represents a subterranean structure.

In accordance with some embodiments, noise encoding is applied to source wavelets of the multiple survey sources, to produce encoded source wavelets. Similarly, in some embodiments, noise encoding is also applied to measured receiver data that is acquired by at least one survey receiver, to produce encoded receiver data. In some implementations, noise encoding of data refers to combining the data with noise (which can be represented by a noise wavelet). A "wavelet" can refer to an oscillating signal that has varying amplitude.

An output representing a subterranean structure can then be produced based on the encoded source data and the encoded receiver data. Computational efficiency is improved by performing processing of data corresponding to multiple sources together, rather than processing data corresponding to individual ones of the sources in separate runs.

In some examples, noise encoding involves convolving the source data or receiver data with the noise. The convolution of $f$ with g can be represented as:

$$f * g = \int_{-\infty}^{\infty} f(T)g(t-T)dT.$$

In some examples, the convolution of two inputs can thus be defined as the integral of the product of the two inputs after one is reversed and time shifted by t.

In some implementations, noise encoding applied to source signals and receiver data can include random noise encoding. Random noise encoding can refer to encoding source data (source wavelets of multiple corresponding survey sources) with random noise, and encoding receiver data (data measured by at least one survey receiver) with random noise. Random noise can be generated based on a random number produced by a pseudo-random number generator, in some examples.

In more specific examples, the random noise for encoding source data and receiver data can be white noise. White noise is a random signal with a relatively flat power spectral density. Such random signal contains equal power within a fixed frequency bandwidth at a particular center frequency. White noise can be represented as a time series of values—if the time series is normally distributed with mean zero and having a standard deviation, the time series can represent Gaussian white noise.

In some embodiments, the noise encoding of the source wavelets and receiver data with noise, such as Gaussian white noise, is performed in the time domain. The noise encoding in the time domain causes both the amplitude and the phase of the source wavelets and/or receiver data to be encoded. Encoding both the amplitude and phase of data can cause a modification of amplitude values of the data, as well as phase values of the data.

FIG. 1 illustrates an example survey arrangement that includes survey sources 102 and survey receivers 104, both provided at an earth surface 106 above a subterranean structure 108. The subterranean structure 108 includes a subterranean element 110 of interest, such as a hydrocarbon reservoir, a freshwater aquifer, a gas injection zone, and so forth. In different examples, a wellbore can be drilled into the subterranean structure 108, and either the survey sources 102 or survey receivers 104, or both, can be placed in the wellbore instead of or in addition to being placed at the earth surface.

Each survey source 102 produces a survey wave that is propagated into the subterranean structure 108. The survey wave produced by each survey source 102 is based on a source wavelet at the survey source 102. This survey wave is represented by a source wavefield (112) that propagates in the subterranean structure 108. The source wavefield 112 is a forward-propagated wavefield that has been forward propagated in time and space to a location of the subterranean element 110.

A receiver wavefield (114) affected by the subterranean structure 108 (e.g., reflected from the subterranean element 110) can be detected by the survey receivers 104. The receiver wavefield 114 represents a back-propagated receiver wavefield, which is the reflected wavefield (as measured by a survey receiver 104), back-propagated in time and space to the location of the subterranean element 110.

The wavefield 114 detected by each survey receiver 104 is referred to as measured receiver data. Note that the measured receiver data at each survey receiver 104 can measure a wavefield propagated in the subterranean structure 108 due to source wavelets at multiple survey sources 102. The source wavelets at the survey sources 102 can be propagated into the subterranean structure 108 together (such as by activating the survey sources 102 concurrently). In such a scenario, the source wavefield 112 results from the blending of the source wavelets at the survey sources 102; the multiple survey sources 102 can thus be considered a "simultaneous survey source" or "blended survey source," since measured survey data is based on contributions from the multiple survey sources of the blended survey source.

FIG. 1 also shows a computing system 120, which can include a computer or a collection of computers. In accordance with some implementations, the computing system 120 includes a data processing module 122 that is used for performing data processing according to some implementations, where the data processing is based on noise encoded source data and noise encoded receiver data.

Figure 2:
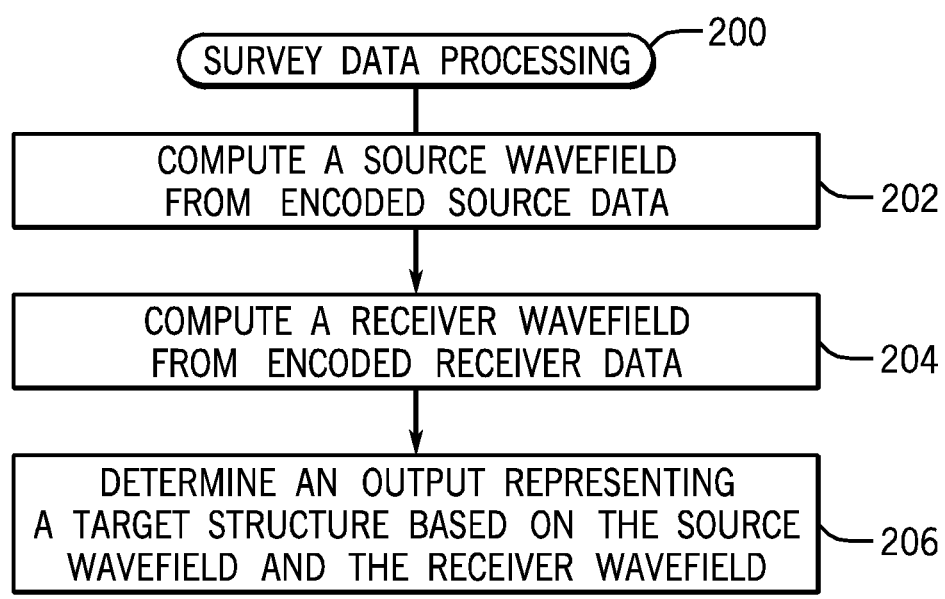
FIGS. 2 and 3 are flow diagrams of processes of determining an output representing a target structure, in accordance with some implementations.

FIG. 2 is a flow diagram of survey data processing 200 according to some embodiments. The process of FIG. 2 can be performed by the data processing module 122 of FIG. 1, for example. The process of FIG. 2 computes (at 202) a source wavefield from encoded source data, where the encoded source data is calculated by performing amplitude and phase encoding of source wavelets with noise. The source wavefield represents the wavefield produced in the subterranean structure 108 in response to the source wavelets generated by the survey sources (e.g., 102 in FIG. 1). The computed source wavefield includes contributions from multiple survey sources (which collectively can be referred to as a "blended survey source" as noted above).

The process of FIG. 2 also computes (at 204) a receiver wavefield from encoded receiver data, where the encoded receiver data is calculated by performing amplitude and phase encoding of measured receiver data with the noise. Measured receiver data can include data measured by one or more of the survey receivers 104 shown in FIG. 1. The receiver wavefield that is computed at 204 represents the wavefield (in the subterranean structure 108) as detected by the survey receiver(s) 104.

The process of FIG. 2 then determines (at 206) an output representing a target structure (e.g., the subterranean structure 108 of FIG. 1) based on the source wavefield and the receiver wavefield. The output representing the target structure can be an image of the target structure, a model of the target structure, or some other type of output.

Figure 3:
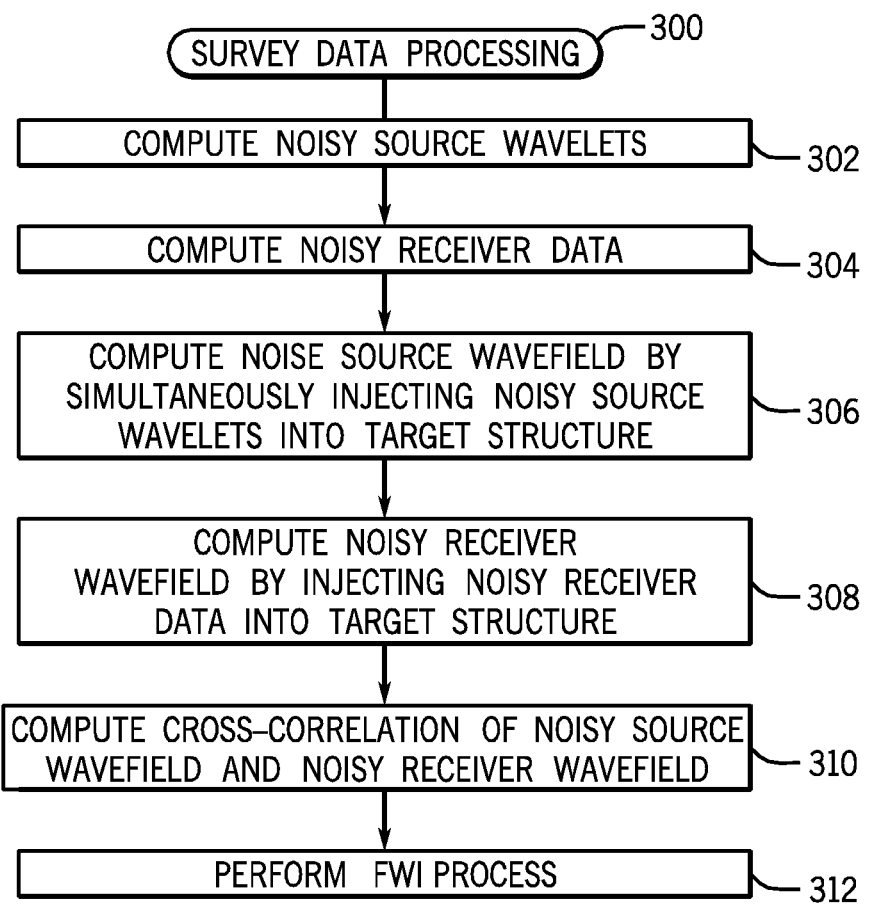
Figure 4:
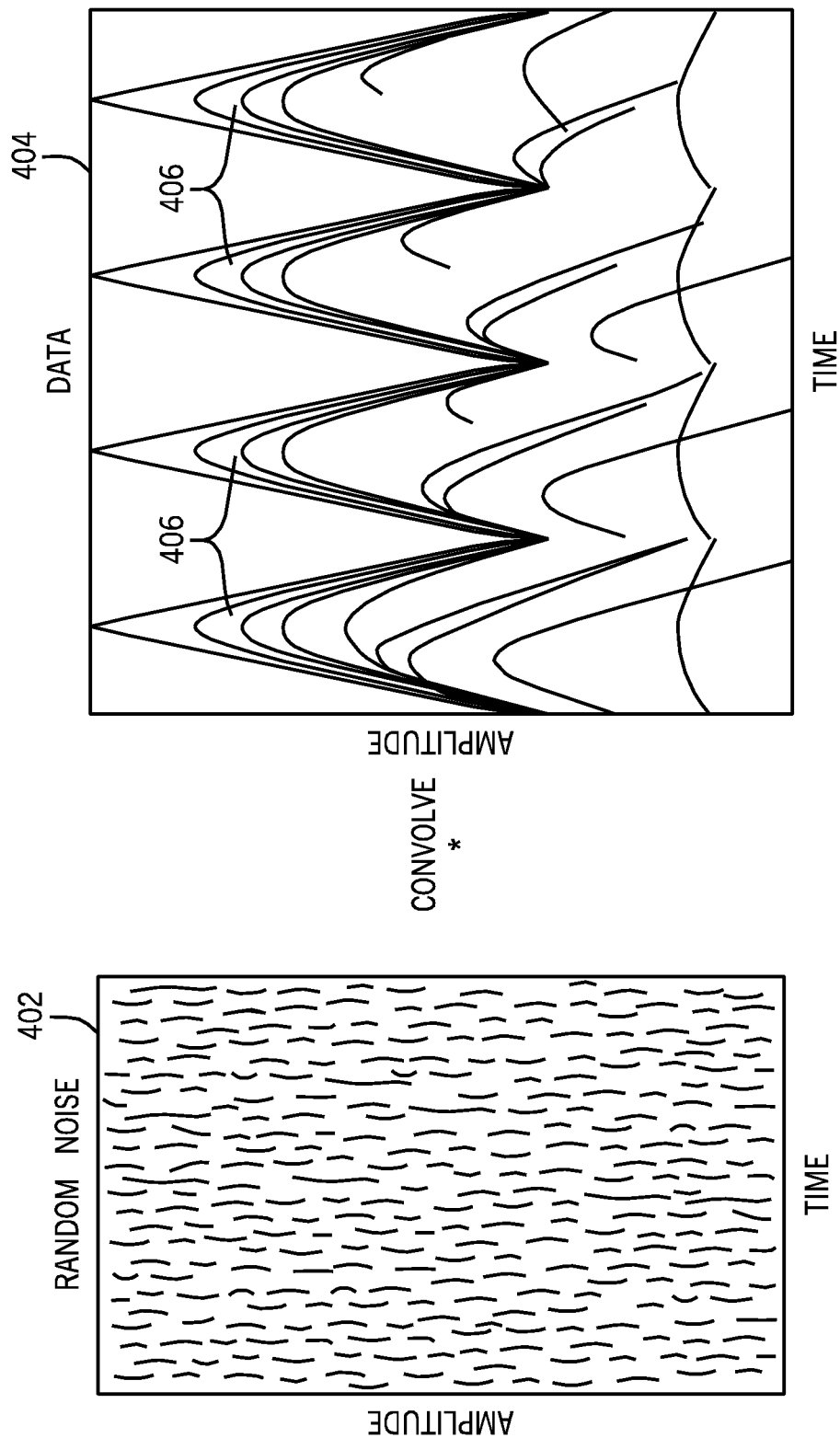
FIG. 4 is a schematic diagram illustrating convolution of random noise with data, in accordance with some implementations.

FIG. 3 is a flow diagram of survey data processing 300 according to further embodiments. The process of FIG. 3 can also be performed by the data processing module 122 of FIG. 1, for example. The process of FIG. 3 computes (at 302) noisy source wavelets by a convolving source wavelets of a group of survey sources (e.g., 102 in FIG. 1) with noise data (which can be represented by a noise wavelet). FIG. 4 shows an example of convolving random noise 402 (e.g., Gaussian white noise) with a source data (404) made up of multiple source wavelets 406 of a blended survey source (having multiple survey sources). Four shots (or activations of the survey sources) are depicted in FIG. 4 for purposes of example.

The process of FIG. 3 also computes (at 304) noisy receiver data by convolving measured receiver data of each shot gather (as detected by a corresponding survey receiver 104) with the corresponding noise wavelet. The measured receiver data at each survey receiver 104 can be convolved with the same noise wavelet used to encode the source wavelets.

A noisy source wavefield is computed (at 306) by simultaneously injecting a combination of noisy source wavelets (associated with a blended source) into the subterranean structure. Injecting a noisy source wavelet can refer to simulating the propagation of the wave due to the noisy source wavelet in the subterranean structure. Simultaneously injecting a combination of noisy source wavelets can refer to simulating the concurrent activation of the multiple sources of the blended source such that the waves from the multiple sources are propagated together into the subterranean structure.

A noisy receiver wavefield is computed (at 308) by injecting the noisy receiver data into the subterranean structure corresponding to the combination of sources. If multiple survey receivers 104 are considered, then the receiver data acquired by the multiple survey receivers can be simultaneously injected into the subterranean structure.

In some embodiments, the process can next compute (at 310) a cross correlation of the noisy source wavefield and the noisy receiver wavefield. In some examples, this can be performed for the purpose of generating an image of the subterranean structure, such as for a migration process.

In the foregoing examples, it is assumed there is just one blended source (made up of a group of survey sources). In other examples, there can be multiple blended sources, each having a respective group of survey sources. Respective noisy source wavefields and noisy receiver wavefields can be computed (at 306, 308) for the corresponding multiple blended sources. The cross-correlation computed (at 310) can be performed between each set of a noisy source wavefield and noisy receiver wavefield, to produce respective outputs. The partial outputs from the multiple instances of cross-correlation can then be stacked, such as by adding or otherwise aggregating the outputs together to form an overall output, which can be an image of the subterranean structure.

In examples where multiple blended sources are used, it is noted that the source wavelets of each blended source can be encoded (at 302) with a corresponding different noise wavelet. For example, assuming there are N (N>1) blended sources, then the source wavelets of blended source 1 is encoded with noise wavelet 1, the source wavelets of blended source 2 is encoded with noise wavelet 2, and so forth. Similarly, different sets of measured receiver data corresponding to corresponding blended sources can be encoded (at 304) with the respective noise wavelets. For example, measured receiver data set 1 (responsive to blended source 1) can be encoded with noise wavelet 1; measured receiver data set 2 (responsive to blended source 2) can be encoded with noise wavelet 2, and so forth.

In some implementations, further processing can be performed, such as an inversion process performed (at 312). In some examples, as noted above, the inversion process can be a full-wave inversion (FWI) process. FWI can be used to build a model of the subterranean structure by performing iterative minimization (or reduction) of a misfit (or mismatch) between observed survey data and synthetic survey data, where synthetic survey data is produced by simulation using a current model of the subterranean structure. The FWI process proceeds through multiple iterations to incrementally update the model. When the difference between observed survey data and the synthetic survey data is less than some predefined threshold, or some other stopping criterion is satisfied, then the current model of the subterranean structure is output.

In performing various iterations of FWI processes, a goal can be to construct a model of a subterranean structure where an objective function is reduced (or minimized). In some FWI processes, a gradient, represented as $g(x)$, of J (the objective function) with respect to a medium parameter m (e.g., velocity or other parameter) is given by a cross-correlation $$g(x) = \sum_{sources} \sum_{receivers} \int_0^T \left( \frac{\partial L}{\partial m} u_s(x, t) \right) u_r(x, T - t) dt, \quad \text{(Eq. 1)}$$

where x represents a coordinate in a volume representing the subterranean structure, T represents a length of a time window (e.g., total time of a particular simulation to compute the synthetic data), and L is a wave equation operator that is written symbolically as Lu=$f$ (where u can be $u_s$ or $u_r$ and $f$ is a force function). Here $u_s$ is the source wavefield and $u_r$ is the receiver wavefield used in full-wave inversion. The gradient of Eq. 1 is used to update the model over iterations of the FWI process.

In Eq. 1, the source wavefield $u_s$ is cross-correlated with the receiver wavefield $u_r$. In accordance with some embodiments, this cross-correlation can be the cross-correlation of the noisy source wavefield and the noisy receiver wavefield performed at 310.

The FWI process incrementally, over multiple iterations until a stopping criterion is satisfied, updates a model of a subterranean structure, where the model is represented as m. The model at any given iteration k is represented as m(k). In iteration k, the model m(k) is updated as follows:

$m(k)=m(k-1)+\gamma(k) \cdot g(k)$, where m(k−1) is the model produced in the previous iteration k−1, γ(k) is a scaling factor, and g(k) is the gradient computed according to Eq. 1.

It is noted that in the iterative FWI process, different noise convolutions can be applied (tasks 302 and 304) in different iterations. The different noise convolutions can use different random noise wavelets. For example, a first iteration of the FWI process can use noise wavelet 1; a second iteration of the FWI process can use noise wavelet 2, and so forth.

In some embodiments, the encoding of source wavelets can use a convolutional encoding function $\phi_s$ (χ) for a given blended source s. Here χ is a stochastic variable which indicates that each encoding function is an independent realization. In the ensuing discussion, χ is dropped, and the encoding function can be written as $\phi_s=\phi_s$ (χ). In some examples, each $\phi_s$ can be a time series evaluated on a time interval t∈[0, $T_c$]. The length of the time series, $T_c$, controls the amount of compression that can be applied. There can be a tradeoff between the number of blended sources and the encoding time $T_c$. To avoid extending the bandwidth, the random series can be generated in Fourier space and then transformed into the time domain.

Techniques or mechanisms according to some embodiments can selectively vary the number of blended sources and/or the convolution length $T_c$. The output can be improved by either (i) including more randomly encoded blended sources, or (ii) increasing the convolution time $T_c$.

If FWI processing is performed, the output model can be improved by changing the random noise encoding at each iteration of the FWI process (as discussed above). In randomized FWI (stochastic gradient method) the encoding function is modified at each gradient iteration so that the randomness stacks out. Since the convolution sequence for each shot is treated as a stochastic variable, the encoding is regenerated for each blended source, and for each iteration of the FWI process.

In some implementations, convergence of an FWI process can be improved by preconditioning the gradient (Eq. 1) of the FWI process using a Hessian operator. In such implementations, encoding of the Hessian operator can be performed by using the noise encoding techniques discussed above. The encoded Hessian operator could also be used as part of a least-squares migration. Because of noise in the gradient or preconditioned gradient resulting from use of noise encoding, some denoising may be performed in the resulting output (e.g., image or model).

Figure 5:
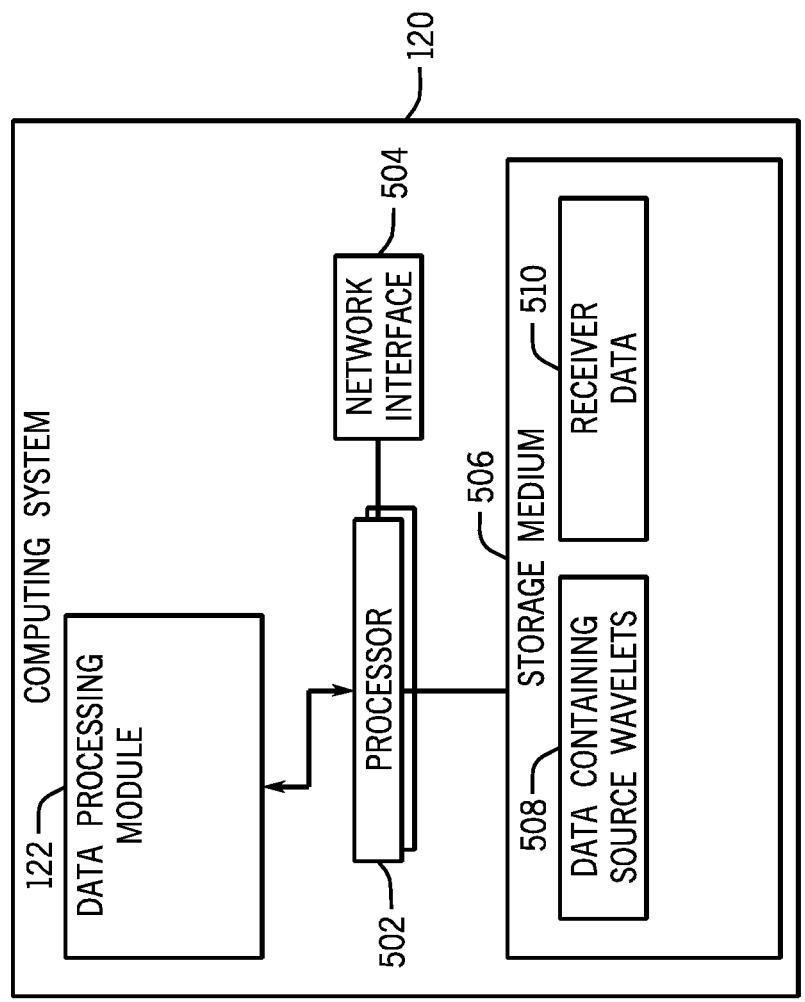
FIG. 5 is a block diagram of an example computing system, according to some implementations.

FIG. 5 is a block diagram of example components of the computing system 120. The computing system 120 includes the data processing module 122 that is able to perform the process of FIG. 2 or 3, for example. In some implementations, the data processing module 122 of FIG. 1 can be implemented as machine-readable instructions loaded for execution on a processor or multiple processors 502. A processor can include a microprocessor, microcontroller, processor module or subsystem, programmable integrated circuit, programmable gate array, or another control or computing device.

The processor(s) 502 can be connected to a network interface 504 to allow the computing system 120 to communicate over a network. In addition, the processor(s) 502 can be connected to a storage medium (or storage media) 506, which can store various types of information, including data containing source wavelets (508), receiver data (510), and other information.

The storage medium (or storage media) 506 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:
1. A method comprising:
    computing, by a system including a processor, a source wavefield from encoded source data calculated by performing phase and amplitude encoding of source wavelets with noise, the source wavelets representing signals generated by survey sources;
    computing, by the system, a receiver wavefield from encoded receiver data calculated by encoding of measured receiver data with the noise, the measured receiver data measured by at least one survey receiver; and producing, by the system, an output representing a target structure based on the source wavefield and the receiver wavefield.

2. The method of claim 1, wherein encoding the source wavelets with the noise includes encoding the source wavelets with random noise.

3. The method of claim 1, wherein encoding the source wavelets with the noise comprises encoding the source wavelets with white noise.

4. The method of claim 1, wherein encoding the source wavelets with the noise includes encoding a first group of source wavelets with first noise, the method further comprising encoding a second group of source wavelets with second, different noise.

5. The method of claim 4, wherein producing the output is further based on the encoded second group of source wavelets.

6. The method of claim 4, further comprising convolving source wavefields derived from the corresponding encoded groups of source wavelets with corresponding receiver wavefields, and producing partial outputs based on respective convolutions.

7. The method of claim 6, further comprising stacking the partial outputs to produce the output representing the target structure.

8. The method of claim 4, wherein the source wavelets of the first and second groups correspond to respective survey sources.

9. The method of claim 1, wherein the producing includes cross-correlating the source wavefield and the receiver wavefield.

10. The method of claim 1, wherein producing the output of the target structure comprises producing an image of the target structure.

11. A computing system comprising:
at least one processor to:
encode source wavelets with noise to produce noisy source wavelets, where the encoding applies phase and amplitude encoding to the source wavelets, the source wavelets representing signals generated by survey sources;
encode receiver data acquired by at least one survey receiver with noise to produce noisy receiver data; and
compute an output representing a target structure using the noisy source wavelets and the noisy receiver data.

12. The computing system of claim 11, wherein the output includes an image of the target structure.

13. The computing system of claim 11, wherein the output includes a model of the target structure, and encoding the source wavelets, encoding the receiver data, and computing the output is part of an iterative inversion process that incrementally updates the model over a plurality of iterations.

14. The computing system of claim 13, wherein the source wavelets and receiver data are encoded with different noise in different iterations of the plurality of iterations.

15. The computing system of claim 11, wherein the at least one processor is to further:
compute a source wavefield based on the noisy source wavelets; and
compute a receiver wavefield based on the noisy receiver data,
wherein the output is based on the source wavefield and the receiver wavefield.

16. The computing system of claim 15, wherein the at least one processor is to further cross correlate the source wavefield and the receiver wavefield, and wherein the output is based on the cross correlation.

17. The computing system of claim 11, wherein the noise is selected from the group consisting of random noise and white noise.

18. The computing system of claim 11, wherein the at least one processor is to further:
encode a second group of source wavelets with second noise to produce a second group of noisy source wavelets;
encode second receiver data responsive to the second group of source wavelets, to produce second noisy receiver data,
wherein the output is further computed based on the second group of noisy source wavelets and the second noisy receiver data.

19. An article comprising at least one non-transitory machine-readable storage medium storing instructions that upon execution cause a system to:
compute a source wavefield from encoded source data calculated by performing encoding of source wavelets with white noise, the source wavelets representing signals generated by survey sources;
compute a receiver wavefield from encoded receiver data calculated by encoding of measured receiver data with the white noise; and
produce an output representing a target structure based on the source wavefield and the receiver wavefield.

20. The article of claim 19, wherein the output includes an image of the target structure.

21. The article of claim 19, wherein the output includes a model of the target structure.

* * * * *